(12) United States Patent  
Iizuka

(10) Patent No.: US 10,250,777 B2  
(45) Date of Patent: Apr. 2, 2019

(54) IMAGE PROCESSING APPARATUS AND NON-TRANSITORY COMPUTER READABLE MEDIUM FOR IMAGE DIFFERENCE CONFIRMATION

(71) Applicant: FUJI XEROX CO., LTD., Tokyo (JP)

(72) Inventor: Miyuki Iizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 357 days.

(21) Appl. No.: 14/697,285

(22) Filed: Apr. 27, 2015

(65) Prior Publication Data  
US 2016/0165093 A1    Jun. 9, 2016

(30) Foreign Application Priority Data  
Dec. 9, 2014  (JP) ................. 2014-248813

(51) Int. Cl.  
*H04N 1/387* (2006.01)  
*G06K 15/02* (2006.01)  
*G06T 3/40* (2006.01)

(52) U.S. Cl.  
CPC ....... *H04N 1/3876* (2013.01); *G06K 15/1878* (2013.01); *G06K 15/1885* (2013.01); *G06T 3/4038* (2013.01); *H04N 1/3873* (2013.01)

(58) Field of Classification Search  
None  
See application file for complete search history.

(56) References Cited

U.S. PATENT DOCUMENTS

| | | | |
|---|---|---|---|
| 8,542,906 B1* | 9/2013 | Persson | G06K 9/00671 382/103 |
| 2002/0018239 A1* | 2/2002 | Ahrens | G06K 15/00 358/1.18 |
| 2003/0147097 A1* | 8/2003 | Kotani | G06K 15/00 358/1.18 |
| 2005/0174590 A1* | 8/2005 | Kubo | H04N 1/622 358/1.9 |
| 2007/0146819 A1* | 6/2007 | Kai | H04N 1/0044 358/474 |
| 2007/0263254 A1* | 11/2007 | Shi | G06T 11/60 358/1.18 |
| 2009/0010501 A1* | 1/2009 | Ogawa | G06K 9/00248 382/118 |

(Continued)

FOREIGN PATENT DOCUMENTS

JP    2009-081819 A    4/2009

*Primary Examiner* — Benny Q Tieu  
*Assistant Examiner* — Haris Sabah  
(74) *Attorney, Agent, or Firm* — Oliff PLC

(57) ABSTRACT

An image processing apparatus includes an image display unit, an area specifying unit, an area display unit, a reference specifying unit, and a reference display unit. The image display unit displays a first image and a second image. The area specifying unit specifies a first area which is at least a portion of the first image. The area display unit displays a second area on the second image. The second area corresponds to the first area. The reference specifying unit specifies a first reference in the first area. The reference display unit displays a second reference in the second area in such a manner that a relative position of the first reference with respect to the first area matches a relative position of the second reference with respect to the second area.

16 Claims, 11 Drawing Sheets

(56) References Cited

U.S. PATENT DOCUMENTS

2013/0301067 A1* 11/2013 Nakamura ......... H04N 1/00037
  358/1.13
2015/0235336 A1*  8/2015 Crutchfield ......... G06F 17/3028
  382/100

* cited by examiner

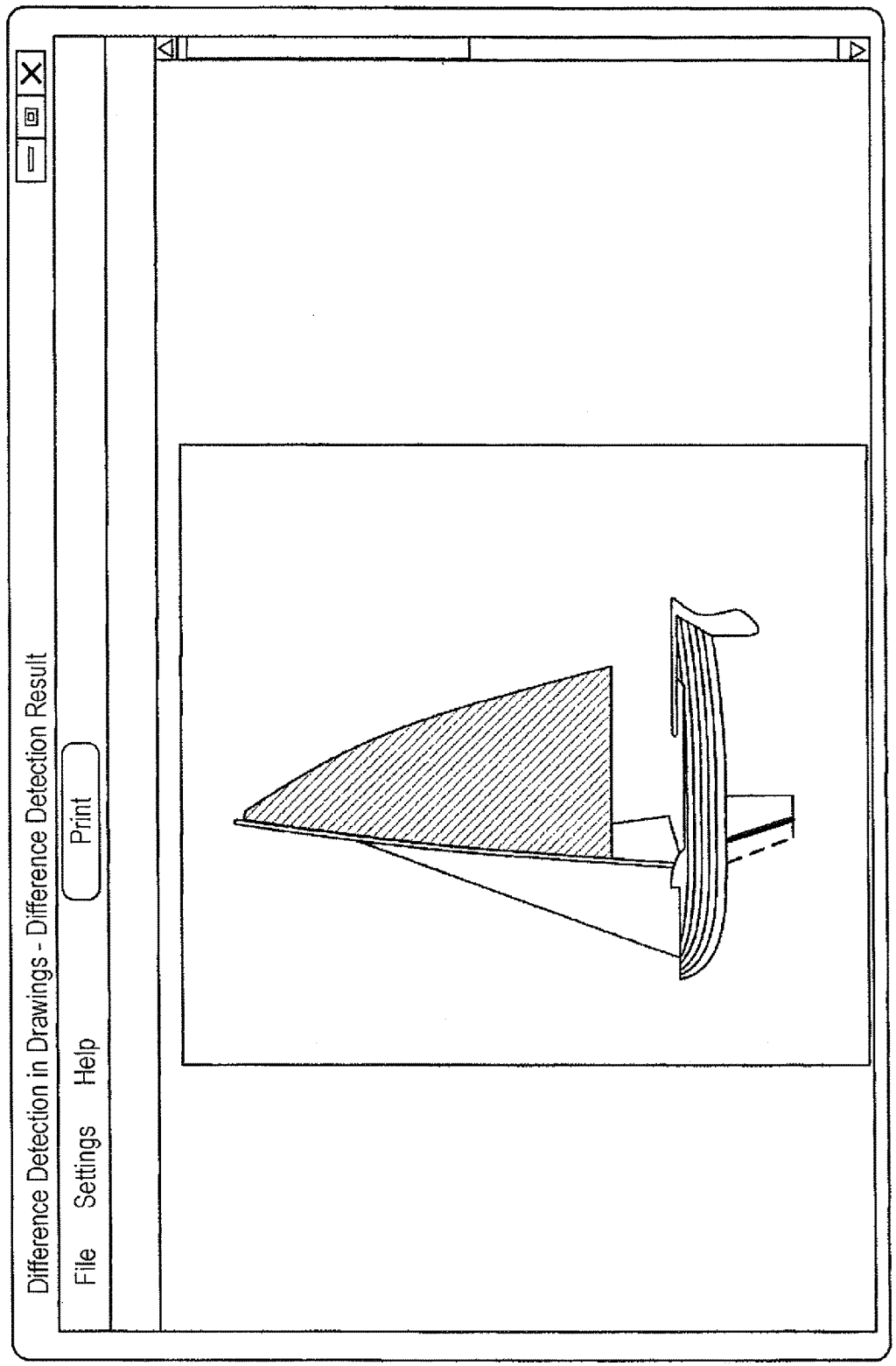

IMAGE PROCESSING APPARATUS AND NON-TRANSITORY COMPUTER READABLE MEDIUM FOR IMAGE DIFFERENCE CONFIRMATION

CROSS-REFERENCE TO RELATED APPLICATIONS

This application is based on and claims priority under 35 USC 119 from Japanese Patent Application No. 2014-248813 filed Dec. 9, 2014.

BACKGROUND

Technical Field

The present invention relates to an image processing apparatus and a non-transitory computer readable medium.

SUMMARY

According to an aspect of the invention, there is provided an image processing apparatus including an image display unit, an area specifying unit, an area display unit, a reference specifying unit, and a reference display unit. The image display unit displays a first image and a second image. The area specifying unit specifies a first area which is at least a portion of the first image. The area display unit displays a second area on the second image. The second area corresponds to the first area. The reference specifying unit specifies a first reference in the first area. The reference display unit displays a second reference in the second area in such a manner that a relative position of the first reference with respect to the first area matches a relative position of the second reference with respect to the second area.

BRIEF DESCRIPTION OF THE DRAWINGS

Exemplary embodiment of the present invention will be described in detail based on the following figures, wherein:

FIG. 11 is a diagram illustrating an exemplary screen in which an exemplary difference detection result is displayed.

DETAILED DESCRIPTION

An exemplary embodiment of the present invention will be described in detail with reference to the drawings.

Figure 1:
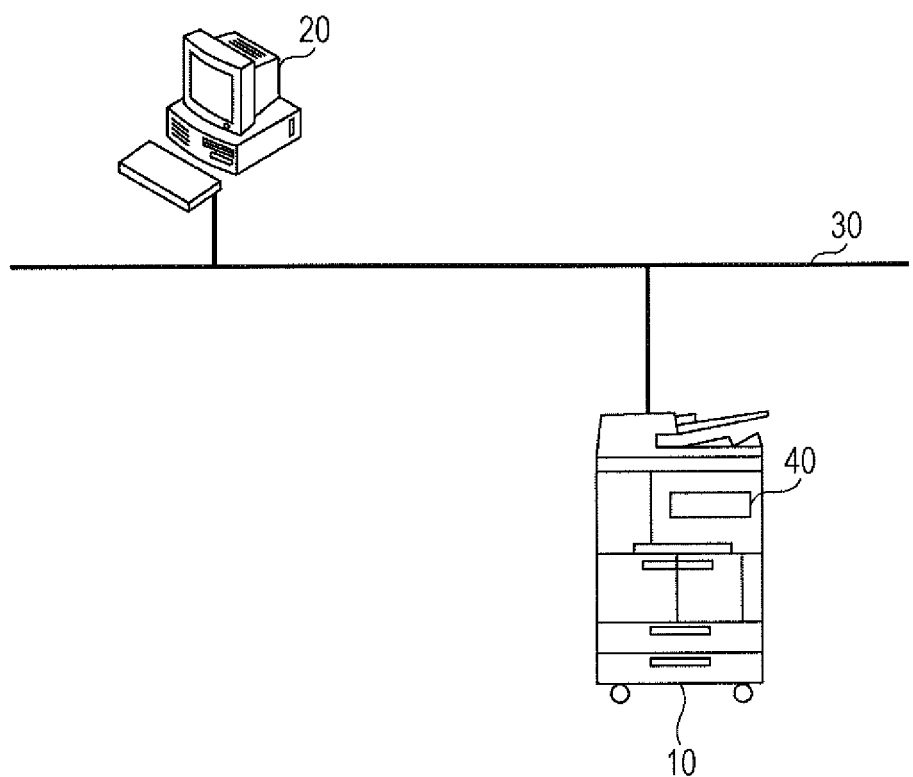
FIG. 1 is a diagram illustrating the system configuration of an image forming system of an exemplary embodiment of the present invention.

FIG. 1 is a block diagram illustrating the configuration of an image forming system according to the exemplary embodiment of the present invention.

As illustrated in FIG. 1, the image forming system using an image processing program according to the exemplary embodiment of the present invention includes an image forming apparatus 10 and a terminal apparatus 20 which are connected to each other via a network 30. The terminal apparatus 20 generates print data and transmits the generated print data to the image forming apparatus 10 via the network 30. The image forming apparatus 10 receives the print data transmitted from the terminal apparatus 20, and outputs an image corresponding to the print data, on a sheet of paper. The image forming apparatus 10 is an apparatus called a multi-function device provided with multiple functions, such as a print function, a scan function, a copy function, and a facsimile function.

The image forming apparatus 10 has a configuration to which a difference-image generating device 40 may be added as an optional function. The difference-image generating device 40 is provided with a function of receiving two pieces of image data to be compared with each other, such as old and new pieces of drawing data, detecting the difference between the two old and new pieces of drawing data, and outputting, e.g., displaying, the detected difference in one piece of image data. For example, the difference-image generating device 40 displays, in red, a portion which is shown in the old drawing and which is deleted from the new drawing, and displays, in blue, a portion which is not shown in the old drawing and which is added to the new drawing, whereby the difference between the old and new pieces of drawing data is displayed in one piece of image data. In addition, in display of the difference, an area in which the difference is detected is surrounded by a rectangular frame so that a portion in which the difference is detected in the rectangle is presented to a user.

The difference-image generating device 40 first converts two pieces of drawing data to be compared with each other, into binary image data, and then sequentially compares pixels in one of the binary images with corresponding pixels in the other binary image, thereby detecting the difference between the two pieces of drawing data.

In the case where the two drawings to be compared with each other are drawn on paper, the scanner of the image forming apparatus 10 first reads the images and converts the images into pieces of image data, and then transmits the pieces of image data to the difference-image generating device 40 to detect the difference between the pieces of image data.

The image forming apparatus 10 prints an image generated on the basis of difference-image data generated by the difference-image generating device 40 on a sheet of paper or the like, thus outputting the difference.

Figure 2:
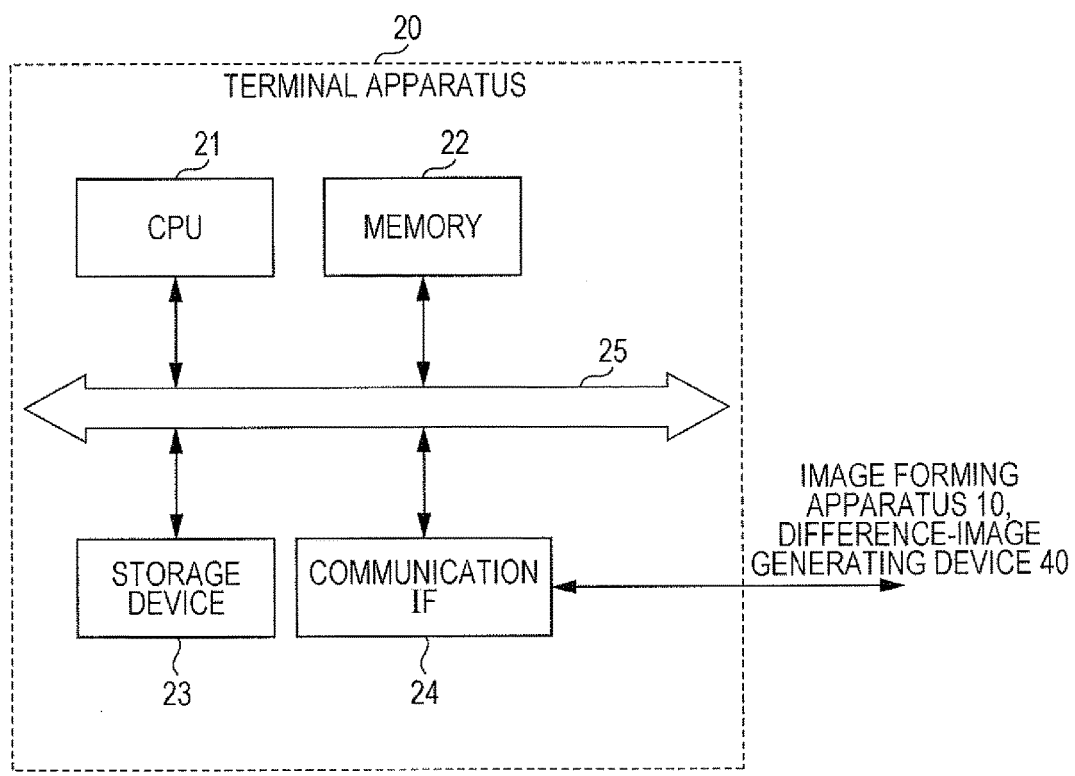
FIG. 2 is a block diagram illustrating the hardware configuration of a terminal apparatus according to the exemplary embodiment of the present invention.

FIG. 2 illustrates the hardware configuration of the terminal apparatus 20 in the image forming system according to the present exemplary embodiment.

Description will be made below about the case in which documents to be compared with each other are drawings. An exemplary embodiment of the present invention is also applicable to a case in which the difference between documents other than drawings, such as text documents, is detected.

As illustrated in FIG. 2, the terminal apparatus 20 includes a central processing unit (CPU) 21, a memory 22, a storage device 23 such as a hard disk drive (HDD), and a communication interface (IF) 24 which receives/transmits data from/to the image forming apparatus 10 or the difference-image generating device 40. These components are connected to one another via a control bus 25.

The CPU 21 performs a predetermined process on the basis of a control program stored in the memory 22 or the storage device 23, and controls the operations of the terminal apparatus 20.

In the present exemplary embodiment, the description is made in which the CPU 21 reads the control program stored in the memory 22 or the storage device 23 and executes the control program. The control program may be stored in a storage medium such as a compact disc-read-only memory (CD-ROM), and may be supplied to the CPU 21.

Figure 3:
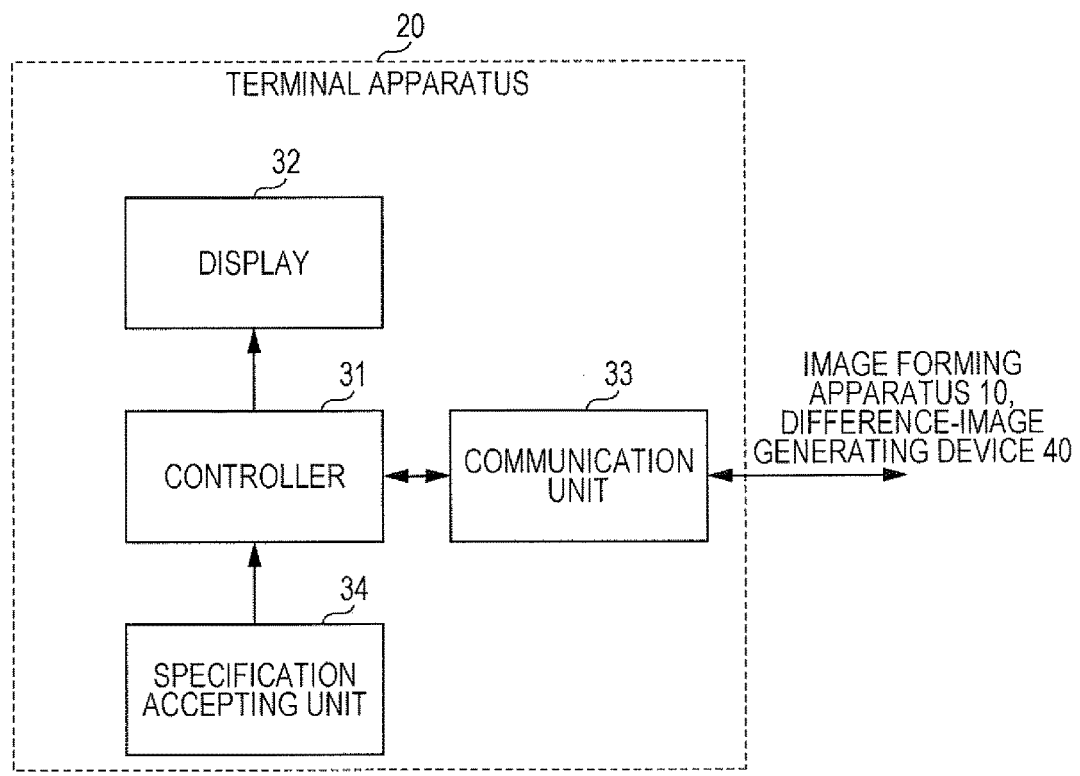
FIG. 3 is a block diagram illustrating the functional configuration of the terminal apparatus according to the exemplary embodiment of the present invention.

FIG. 3 is a block diagram illustrating the functional configuration of the terminal apparatus 20 which is achieved by executing the above-described control program.

As illustrated in FIG. 3, the terminal apparatus 20 according to the present exemplary embodiment includes a controller 31, a display 32, a communication unit 33, and a specification accepting unit 34.

The communication unit 33, for example, transmits image data and the like to the image forming apparatus 10 or the difference-image generating device 40, and receives image data obtained through scanning performed by the image forming apparatus 10.

In an image displayed on the display 32, the specification accepting unit 34 specifies an area in which a difference is to be locally detected, and accepts various types of specification such as specification of the position of a reference display to be displayed in the area.

The controller 31 receives/transmits data from/to the image forming apparatus 10 or the difference-image generating device 40 via the communication unit 33, and controls display operations of the display 32 on the basis of various types of specification accepted from a user by the specification accepting unit 34.

The controller 31 determines two images which are to be compared with each other for difference detection, on the basis of input of the various types of specification received from the specification accepting unit 34, and transmits the image data of the two images to the difference-image generating device 40 via the communication unit 33. When the controller 31 receives a difference detection result from the difference-image generating device 40 via the communication unit 33, the controller 31 causes the display 32 to display the difference detection result.

The display 32 displays the two images, i.e., a first image and a second image, which are to be subjected to difference detection.

The specification accepting unit 34 accepts specification of a first area which is at least a portion of the area of one of the two images to be compared with each other.

The display 32 displays a second area corresponding to the first area and having the same size, on the other image among the two images to be compared with each other.

The specification accepting unit 34 accepts input of specification of a first reference in the first area.

The display 32 displays a second reference in the second area so that the relative position of the first reference with respect to the first area matches the relative position of the second reference with respect to the second area.

Instead of displaying the first reference and the second reference in the first area and the second area, respectively, the display 32 may display the image of the first area in the first image on the image of the second area in a state in which the image of the first area is made transparent.

The display 32 may display the image of the first area in the first image in the second image in a state in which pixel values in the image of the first area are inverted.

The display 32 may display the image of the second area in the second image on the image of the first area in a state in which the image of the second area is made transparent, or may display the image of the second area in the second image in the first image in a state in which pixel values of the image of the second area are inverted.

The display 32 may switch between a first display mode (display form) and a second display mode. The first display mode is a mode in which the first reference and the second reference are displayed in the first area and the second area, respectively. The second display mode is a mode in which the image of the first area in the first image is displayed on the second image in a state in which the image of the first area is made transparent.

While displaying the first reference and the second reference in the first area and the second area, respectively, the display 32 may display the image of the first area in the first image on the second image in a state in which the image of the first area is made transparent, or may display the image of the second area in the second image on the first image in a state in which the image of the second area is made transparent.

The difference-image generating device 40 is provided with a difference detector which detects the difference between the image of the first area in the first image and the image of the second area in the second image.

An operation performed in the image forming system according to the present exemplary embodiment when difference-image data is generated will be described in detail with reference to the drawings.

Figure 4:
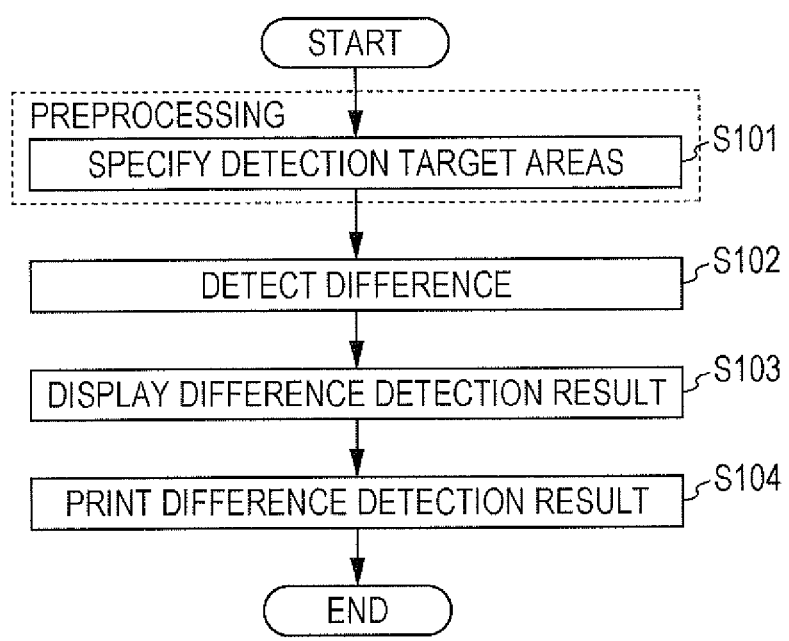
FIG. 4 is a flowchart for describing the overall operation performed when difference-image data is generated in the image forming system according to the exemplary embodiment of the present invention.

The overall operation performed in the image forming system according to the present exemplary embodiment when difference-image data is generated will be described by referring to the flowchart in FIG. 4.

In the image forming system according to the present exemplary embodiment, when a difference detection process is to be performed, preprocessing for difference detection is performed by the terminal apparatus 20. In the preprocessing, detection target areas are specified as areas for setting partial images to be subjected to difference detection, in two pieces of drawing data to be subjected to difference detection (in step S101). The detail of how to specify detection target areas will be described below.

The images of detection target areas 201 and 202 in the respective pieces of drawing data are transmitted as target images for difference detection to the difference-image generating device 40 via the communication unit 33, and a difference detection process is performed (in step S102).

The result of the difference detection process performed in step S102 is transmitted as difference-image data to the terminal apparatus 20 via the communication unit 33, and is displayed on the display 32 (in step S103).

The difference-image data is transmitted to the image forming apparatus 10 via the communication unit 33, and is printed as a difference image on a sheet of paper (in step S104).

The detail of how to specify detection target areas, which is described in step S101, will be described with reference to the drawings.

Figure 5:
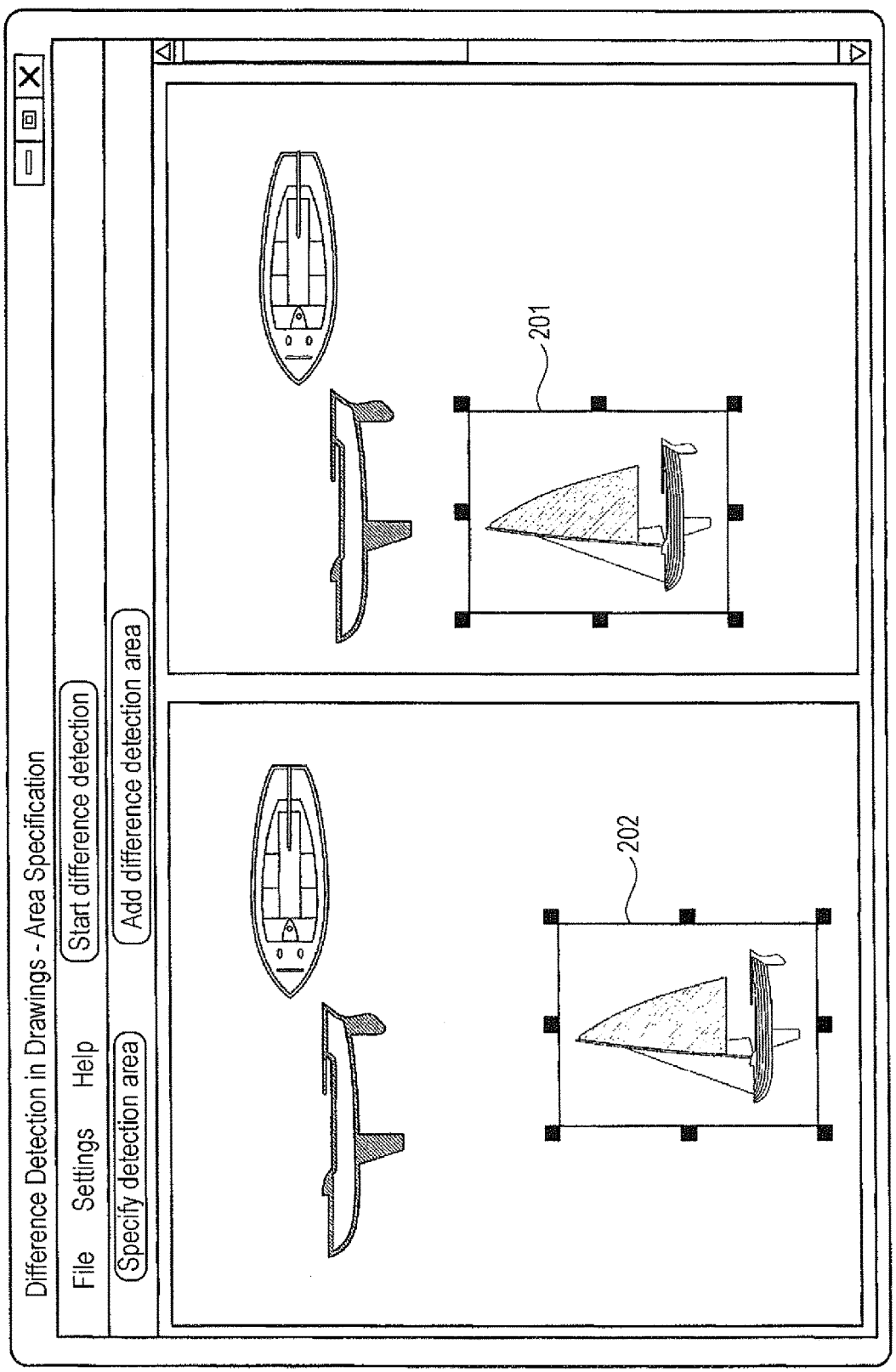
FIG. 5 is a diagram illustrating an exemplary screen used when detection target areas are specified.

FIG. 5 illustrates an exemplary screen used when detection target areas are specified. The exemplary screen illustrated in FIG. 5 illustrates the state in which the detection target areas 201 and 202 to be subjected to difference detection are specified by using frames, on two pieces of drawing data displayed from side to side.

In the exemplary screen in FIG. 5, for example, an operation on a button of "Add difference detection area" causes detection target areas (difference detection areas) 201 and 202 (the first area and the second area) which correspond to each other, to be displayed in the respective right and left images. A change in the size of one of the right and left detection target areas 201 and 202 causes a change in the size of the other area, whereby the sizes always match each other.

The detection target areas 201 and 202 are capable of being independently moved on the respective right and left sides. Therefore, a user may specify partial images as difference detection targets in such a manner as to move the detection target areas 201 and 202 to specify the areas for the partial images to be subjected to difference detection. FIG. 5 illustrates a state in which the overall view of a sailing boat is specified as a partial image in the right and left images.

Figure 6:
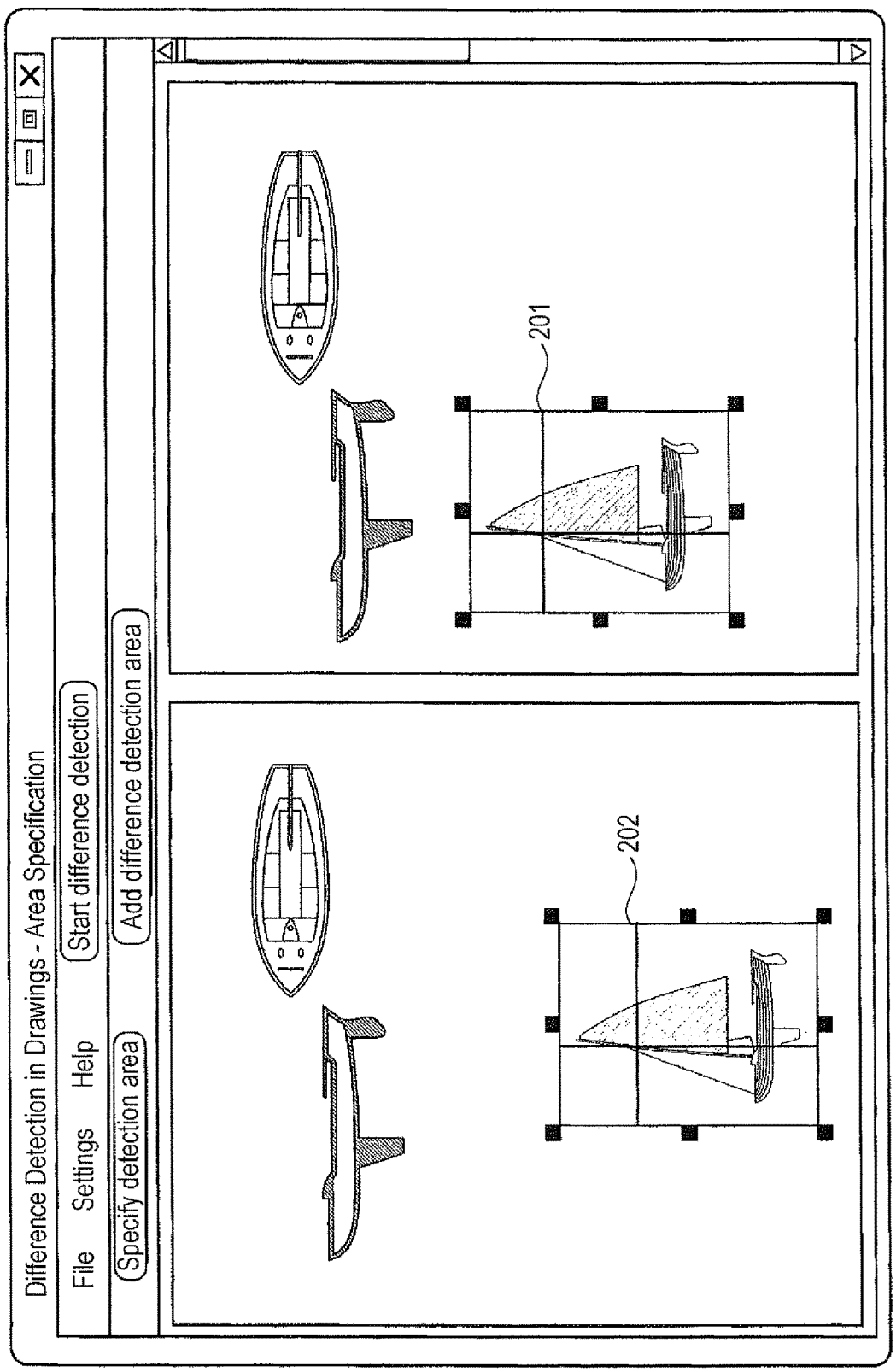
FIG. 6 is a diagram illustrating an exemplary screen in which cross-shaped reference images are displayed in the detection target areas.

FIG. 6 illustrates the state in which a user operates a specific button to display a reference image for specifying an indicated position in the image, in the detection target areas 201 and 202.

In the exemplary screen illustrated in FIG. 6, a cross-shaped image constituted by a horizontal line and a vertical line which cross each other at right angles is displayed as a reference image in each of the detection target areas 201 and 202. The intersection point of the cross-shaped reference image is moved horizontally and vertically in accordance with a user operation on a cursor key or a user operation on a mouse. That is, the reference image has a shape which enables the position indicated by a user to be specified in the images of the detection target areas 201 and 202. In the case of the cross-shaped reference image as illustrated in FIG. 6, the intersection point of the two lines is used to specify a position in an image.

Moving the intersection point of the cross-shaped reference image in the detection target area 201 causes the intersection point of the cross-shaped reference image in the detection target area 202 to be moved. That is, setting is made so that the relative position of the cross-shaped reference image with respect to the detection target area 201 matches that with respect to the detection target area 202.

Therefore, for example, the user moves the intersection point portion of the cross-shaped reference image to a specific position of the sailing boat in the partial image in the detection target area 201. If this operation causes the intersection point portion of the cross-shaped reference image in the detection target area 202 on the opposite side to be moved to the corresponding position, this confirms that specification of the position of the partial image in the left image is similar to that in the right image.

When the intersection point portions of the cross-shaped reference images are located at different positions in the partial images, the entire detection target area 201 or the entire detection target area 202 are moved so that the intersection point portions of the cross-shaped reference images are located at the same position in the partial images, whereby the position specification for the partial images may be adjusted.

Figure 7:
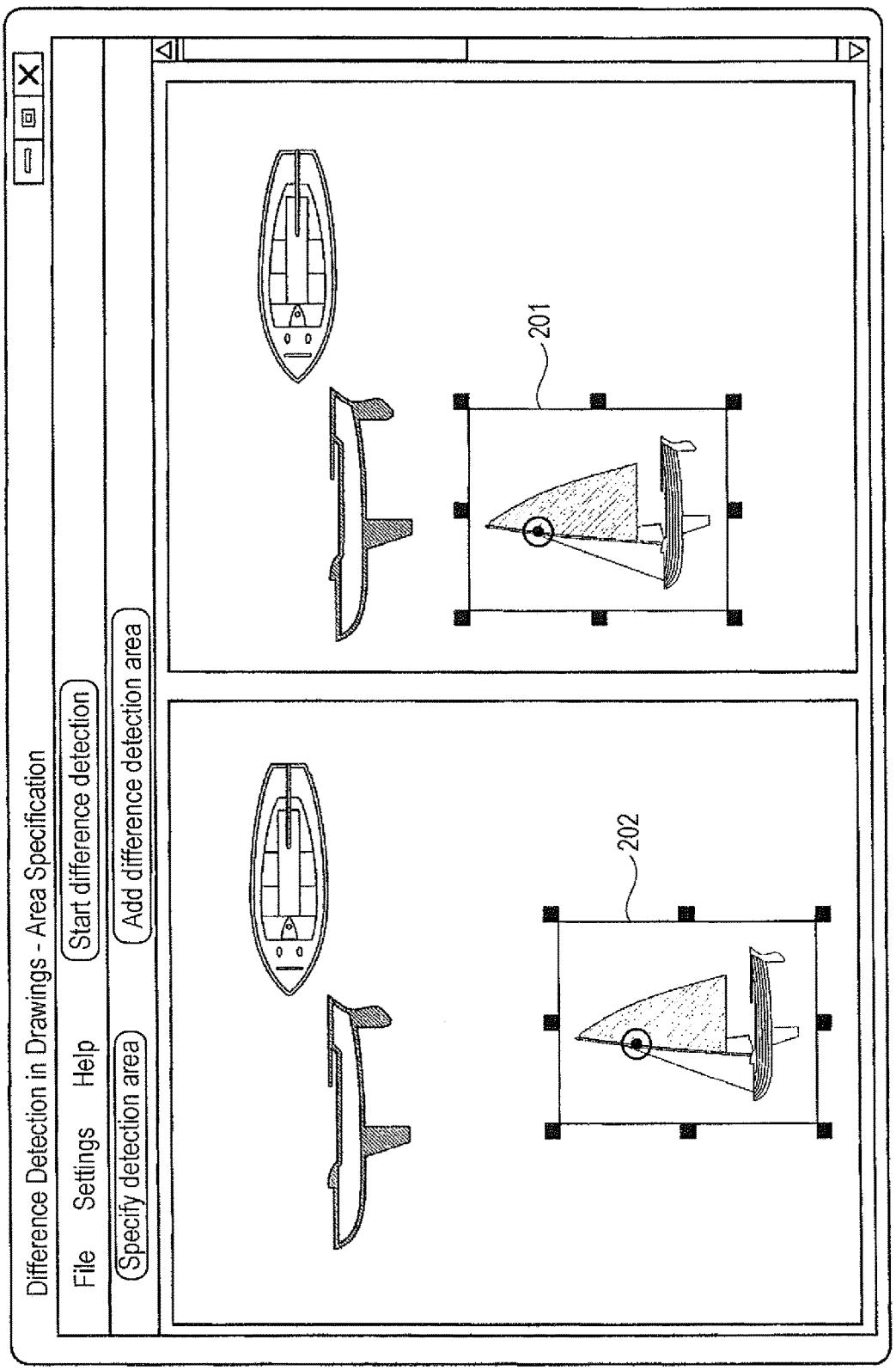
FIG. 7 is a diagram illustrating an exemplary screen in which circular reference images are displayed in the detection target areas.

The reference image displayed in the detection target areas 201 and 202 is not limited to a cross-shaped image as illustrated in FIG. 6, and may be, for example, a circle and dot as illustrated in FIG. 7, or graphics display as long as the indicated position may be specified and the display position may be changed on the basis of a user operation.

Another method which is different from the method, as illustrated in FIGS. 6 and 7, of positioning the detection target areas 201 and 202 in the right and left images by displaying the reference image in the detection target areas 201 and 202 will be described with reference to FIG. 8.

Figure 8:
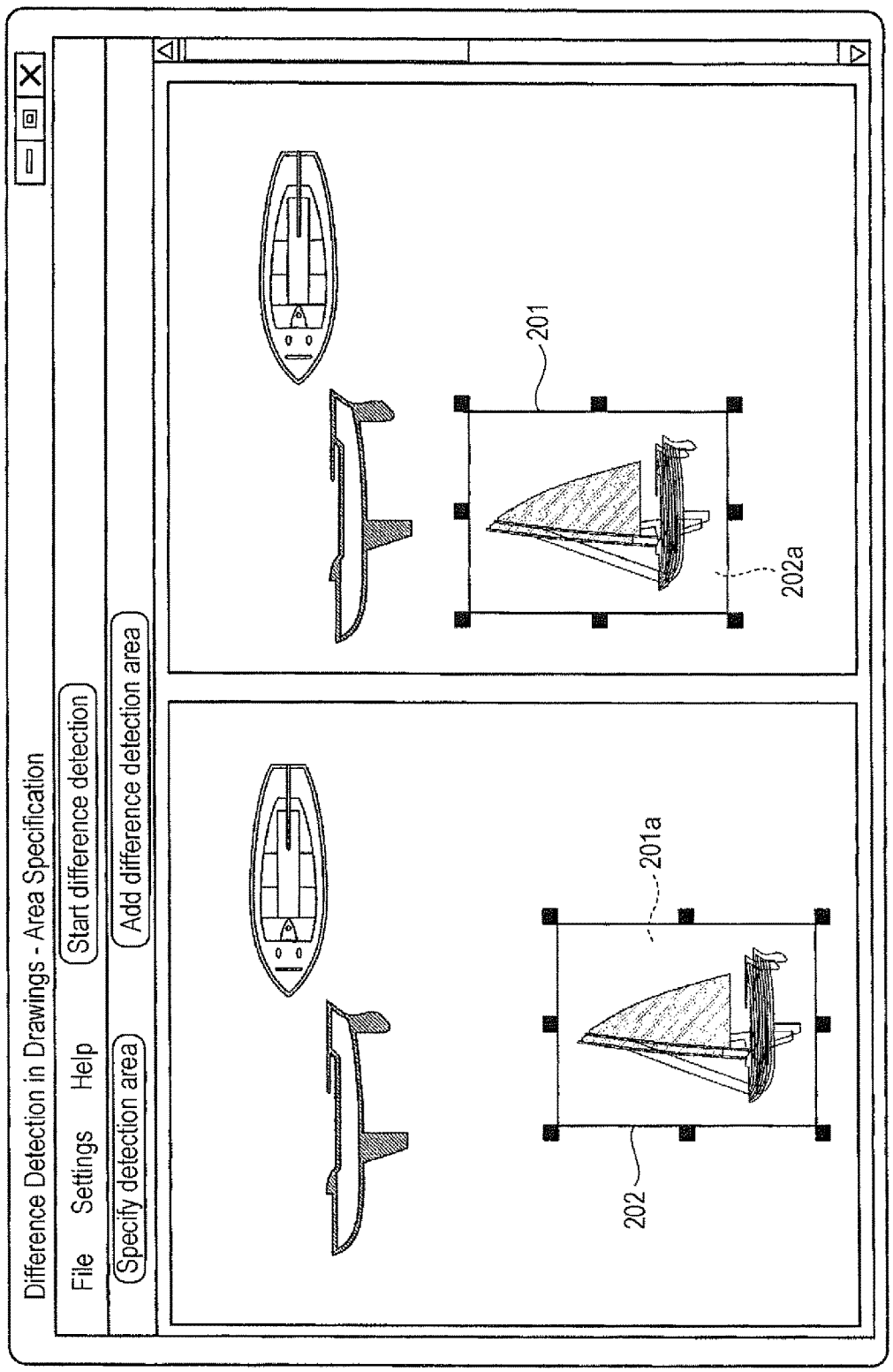
FIG. 8 is a diagram illustrating an exemplary screen in which see-through images are displayed on the images in the respective detection target areas.

In the exemplary screen illustrated in FIG. 8, instead of displaying a reference image in each of the detection target areas 201 and 202, a see-through image 201a obtained by making the image of the detection target area 201 transparent is displayed in such a manner as to overlie the image of the detection target area 202 displayed on the opposite side, and a see-through image 202a obtained by making the image of the detection target area 202 transparent is displayed in such a manner as to overlie the image of the detection target area 201 displayed on the opposite side.

In the exemplary screen illustrated in FIG. 8, misregistration between the detection target areas 201 and 202 in the right and left images causes misregistration between the see-through image 201a and the image of the detection target area 202, and also causes misregistration between the see-through image 202a and the image of the detection target area 201.

In this state, the specified positions for the detection target areas 201 and 202 are adjusted so that the image of the detection target area 201 and that of the detection target area 202 are overlaid with the see-through image 202a and the see-through image 201a, respectively, whereby the misregistration between the detection target areas 201 and 202 in the right and left images is corrected.

Figure 9A:
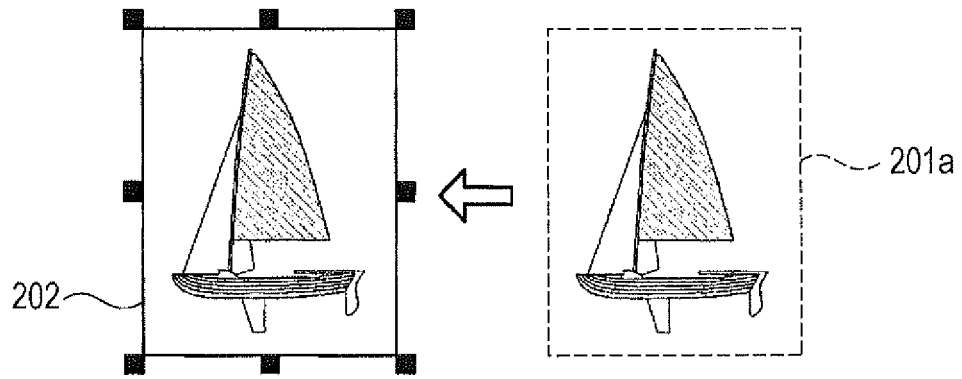
FIGS. 9A to 9C are diagrams for describing how to correct the position of a detection target area by displaying a see-through image in the detection target area.
Figure 9B:
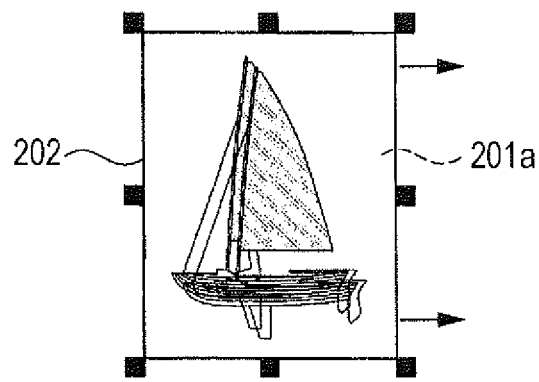
Figure 9C:
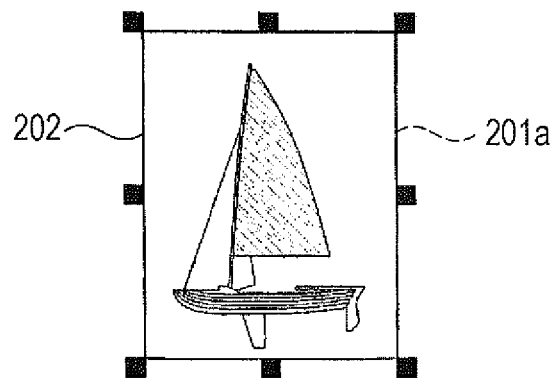

That is, as illustrated in FIG. 9A, the see-through image 201a is displayed in the detection target area 202, and as illustrated in FIG. 9B, the position of the detection target area 202 is corrected so that the misregistration between the image of the detection target area 202 and the see-through image 201a is eliminated, achieving the state as illustrated in FIG. 9C. Accordingly, a user may eliminate the misregistration between the detection target areas 201 and 202.

In FIGS. 8 and 9A to 9C, after being made transparent, the image of one of the detection target areas is displayed on the image of the other detection target area. After being made transparent and being then subjected to a tone reversal process (process of inverting pixel values), the image of one of the detection target areas may be displayed on the image of the other detection target area.

Figure 10A:
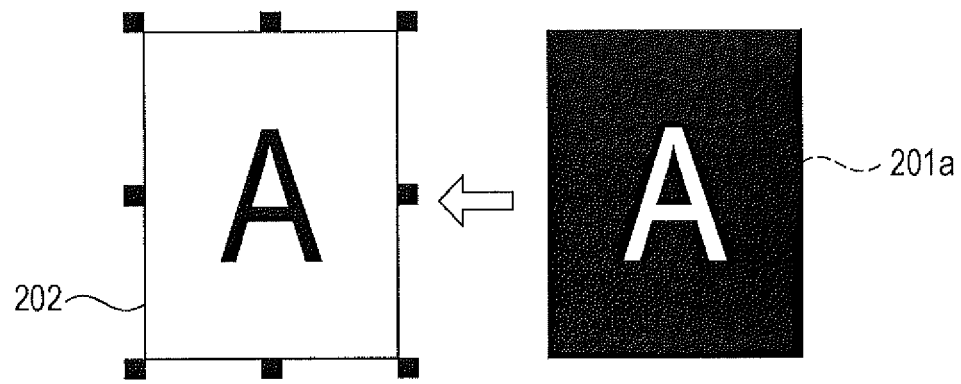
FIGS. 10A to 10C are diagrams for describing how to correct the position of a second detection target area by displaying, in the second detection target area, a see-through image obtained by making the image of a first detection target area transparent and then turning black pixels white and vice versa in the transparent image.
Figure 10B:
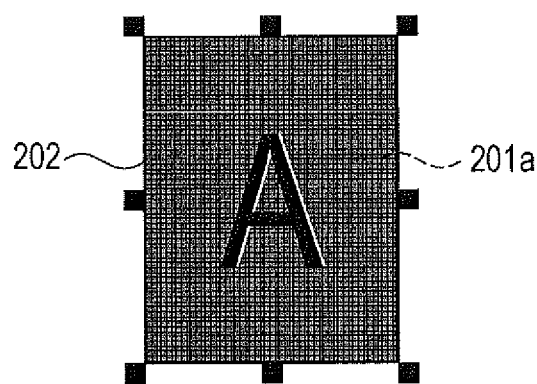
Figure 10C:
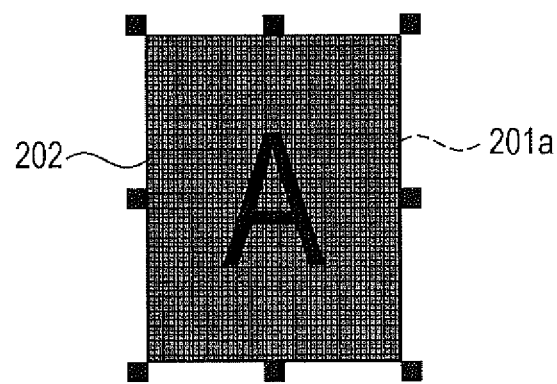

For example, as illustrated in FIG. 10A, the see-through image 201a obtained by making the image of the detection target area 201 transparent and then turning black pixels white and vice versa in the image is displayed in the detection target area 202. As illustrated in FIG. 10B, the position of the detection target area 202 is corrected so that misregistration between the image of the detection target area 202 and the see-through image 201a is eliminated, achieving the state as illustrated in FIG. 10C. Accordingly, a user may eliminate the misregistration between the detection target areas 201 and 202.

In the example illustrated in FIGS. 10A to 10C, since the tone reversal process is performed, visual grasp about whether or not the images completely match each other is easily acquired in some image types. In the example illustrated in FIGS. 10A to 10C, the images of the detection target areas 201 and 202 are character images. When misregistration between the images is present, whether or not the two images match each other may be easily checked by checking the white portions.

FIG. 11 illustrates an exemplary detection result obtained when portions of the images to be compared with each other are specified as partial images to perform difference detection as described above. In the exemplary screen illustrated in FIG. 11, a portion added in the changed drawing is represented by a bold line, and a portion which is present in the original drawing and which is not present in the changed drawing is represented by a dotted line.

Therefore, from the original drawing and the changed drawing, a user may grasp which part is deleted and which part is added, on the basis of the detection result as illustrated in FIG. 11.

The display may be switched between the display of the reference image illustrated in FIG. 6 or 7 and the display of the see-through image illustrated in FIG. 8, which are described above, through an operation on a predetermined button, such as the space key or the escape key. The switching between the two positioning functions as described above enables a user to more easily specify the positions of the areas of the partial images in the right and left images.

In the above description, when the area of a partial image is to be specified, the detection target area 201 or the detection target area 202 is adjusted in the state in which the two right and left images are displayed. When the position of the area of a partial image is to be adjusted while a see-through image is being displayed, the position may be adjusted in the state in which only one image is displayed on the screen and in which the displayed image is enlarged.

In the above description, as illustrated in FIG. 8, the see-through images 201a and 202a are displayed in the detection target areas 202 and 201, respectively, located on the opposite side. Only one of the see-through images may be displayed on the detection target area located on the opposite side.

The programs described above may be provided through a recording medium which stores the programs, or may be provided through a communication unit. In these cases, for example, the programs described above may be interpreted as an invention of "a computer-readable recording medium that stores a program".

The term "a computer-readable recording medium that stores a program" refers to a computer-readable recording medium that stores programs and that is used for, for example, the installation and execution of the programs and the distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-Ray® Disk, a magneto-optical disk (MO), a flexible disk (FD), a magnetic tape, a hard disk, a ROM, an electrically erasable programmable ROM (EEPROM®), a flash memory, a RAM, and a secure digital (SD) memory card.

The above-described programs or some of them may be, for example, stored and distributed by recording them on the recording medium. In addition, the programs may be transmitted through communication, for example, by using a transmission medium of, for example, a wired network which is used for a local area network (LAN), a metropolitan area network (MAN), a wide area network (WAN), the Internet, an intranet, an extranet, and the like, a wireless communication network, or a combination of these. Instead, the programs may be carried on carrier waves.

The above-described programs may be included in other programs, or may be recorded on a recording medium along with other programs. Instead, the programs may be recorded on multiple recording media by dividing the programs. The programs may be recorded in any format, such as compression or encryption, as long as it is possible to restore the programs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a display that displays a first image and a second image simultaneously, the first image and the second image being distinct images derived from distinct image data; and
   a processor programmed to:
   specify a first area which is at least a portion of the first image,
   display a second area on the second image, the second area corresponding to the first area,
   specify and display a first reference in the first area on the first image, the first reference being different from the first image,
   display a second reference in the second area on the second image, the second reference being different from the second image,
   wherein
   a relative position of the first reference with respect to the first area is automatically moved to match a relative position of the second reference with respect to the second area each time the second reference is moved, and the relative position of the second reference with respect to the second area is automatically moved to match the relative position of the first reference with respect to the first area each time the first reference is moved, thereby facilitating confirmation of the relative positions, and
   display a third image using third image data generated based on a difference detected between a first area image of the first area of the first image and a second area image of the second area of the second image, the third image showing at least one of a portion of the first image which is not present in the second image and a portion of the second image which is not present in the first image, thereby facilitating confirmation of the difference between the first area image of the first area and the second area image of the second area.

2. The image processing apparatus according to claim 1, wherein
the first reference and the second reference show positions on the first and second images.

3. The image processing apparatus according to claim 1, wherein
the first reference and the second reference have a cross shape constituted by a horizontal line and a vertical line which cross each other at right angles.

4. The image processing apparatus according to claim 1, wherein
the processor is further programmed to display the first area of the first image on the second image in a state in which the first area is made transparent, in such a manner that a relative position of the first area with respect to the first image matches a relative position of the second area with respect to the second image.

5. The image processing apparatus according to claim 2, wherein
the processor is further programmed to display the first area of the first image on the second image in a state in which the first area is made transparent, in such a manner that a relative position of the first area with respect to the first image matches a relative position of the second area with respect to the second image.

6. The image processing apparatus according to claim 5, the processor is further programmed to switch between a first display form and a second display form, the first display form being a display form in which the first reference and the second reference are displayed in the first area and the second area, respectively, the second display form being a display form in which the first area of the first image is displayed on the second image in the state in which the first area is made transparent.

7. The image processing apparatus according to claim 5, wherein, while the first reference and the second reference are being displayed in the first area and the second area, respectively, the first area of the first image is capable of being displayed on the second image in the state in which the first area is made transparent.

8. The image processing apparatus according to claim 3, wherein
the processor is further programmed to display the first area of the first image on the second image in a state in which the first area is made transparent, in such a manner that a relative position of the first area with respect to the first image matches a relative position of the second area with respect to the second image.

9. The image processing apparatus according to claim 8, wherein the processor is further programmed to switch between a first display form and a second display form, the first display form being a display form in which the first reference and the second reference are displayed in the first area and the second area, respectively, the second display form being a display form in which the first area of the first image is displayed on the second image in the state in which the first area is made transparent.

10. The image processing apparatus according to claim 8, wherein, while the first reference and the second reference are being displayed in the first area and the second area, respectively, the first area of the first image is capable of being displayed on the second image in the state in which the first area is made transparent.

11. The image processing apparatus according to claim 4, the processor is further programmed to switch between a first display form and a second display form, the first display form being a display form in which the first reference and the second reference are displayed in the first area and the second area, respectively, the second display form being a display form in which the first area of the first image is displayed on the second image in the state in which the first area is made transparent.

12. The image processing apparatus according to claim 4, wherein, while the first reference and the second reference are being displayed in the first area and the second area, respectively, the first area of the first image is capable of being displayed on the second image in the state in which the first area is made transparent.

13. An image processing apparatus comprising:
a display that displays a first image and a second image simultaneously; and
a processor programmed to:
specify a first area which is at least a portion of the first image;
display a second area on the second image, the second area corresponding to the first area,
display the first area of the first image as a first visible image on top of a second visible image of the second area of the second image in a state in which the first area is displayed as transparently overlying the second area, and display the second area of the second image as a third visible image on top of a fourth visible image of the first area of the first image in a state in which the second area is displayed as transparently overlying the first area, thereby facilitating correction of misalignment between the first area and the second area,
correct the misalignment by moving at least one of the first area and the second area, and
display a third image using third image data generated based on a difference detected between a first area image of the first area of the first image and a second area image of the second area of the second image, the third image showing at least one of a portion of the first image which is not present in the second image and a portion of the second image which is not present in the first image, thereby facilitating confirmation of the difference between the first area image of the first area and the second area image of the second area.

14. The image processing apparatus according to claim 13, the processor is further programmed to display the first area image of the first area of the first image on the second area image of the second area in a state in which pixel values of the first area image of the first area are inverted.

15. A non-transitory computer readable medium storing a program causing a computer to execute a process comprising:
displaying on a display a first image and a second image simultaneously, the first image and the second image being distinct images derived from distinct image data;
specifying a first area which is at least a portion of the first image;
displaying a second area on the second image, the second area corresponding to the first area;
specifying and displaying a first reference in the first area on the first image, the first reference being different from the first image;
displaying a second reference in the second area on the second image, the second reference being different from the second image, wherein a relative position of the first reference with respect to the first area is automatically moved to match a relative position of the second reference with respect to the second area each time the second reference is moved, and the relative position of the second reference with respect to the second area is automatically moved to match the relative position of the first reference with respect to the first area each time the first reference is moved, thereby facilitating confirmation of the relative positions; and displaying a third image using third image data generated based on a difference detected between a first area image of the first area of the first image and a second area image of the second area of the second image, the third image showing at least one of a portion of the first image which is not present in the second image and a portion of the second image which is not present in the first image, thereby facilitating confirmation of the difference between the first area image of the first area and the second area image of the second area.

16. A non-transitory computer readable medium storing a program causing a computer to execute a process comprising:

displaying on a display a first image and a second image simultaneously;

specifying a first area which is at least a portion of the first image;

displaying a second area on the second image, the second area corresponding to the first area;

displaying the first area of the first image as a first visible image on top of a second visible image of the second area of the second image in a state in which the first area is displayed as transparently overlying the second area, and displaying the second area of the second image as a third visible image on top of a fourth visible image of the first area of the first image in a state in which the second area is displayed as transparently overlying the first area, thereby facilitating correction of misalignment between the first area and the second area;

correcting the misalignment by moving at least one of the first area and the second area; and displaying a third image using third image data generated based on a difference detected between a first area image of the first area of the first image and a second area image of the second area of the second image, the third image showing at least one of a portion of the first image which is not present in the second image and a portion of the second image which is not present in the first image, thereby facilitating confirmation of the difference between the first area image of the first area and the second area image of the second area.

* * * * *